US012803394B2

(12) United States Patent
Birkmayer

(10) Patent No.: US 12,803,394 B2
(45) Date of Patent: Nov. 17, 2026

(54) STATOR FOR AN ELECTRIC MACHINE WITH ELECTRICAL CONDUCTORS CONNECTED IN A STAR POINT, AIRCRAFT

(71) Applicant: Rolls-Royce Deutschland Ltd & Co KG, Blankenfelde-Mahlow (DE)

(72) Inventor: Wolfram Siegfried Birkmayer, Hirschaid (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 344 days.

(21) Appl. No.: 18/556,259

(22) PCT Filed: Apr. 27, 2022

(86) PCT No.: PCT/EP2022/061229
§ 371 (c)(1),
(2) Date: Nov. 21, 2023

(87) PCT Pub. No.: WO2022/229270
PCT Pub. Date: Nov. 3, 2022

(65) Prior Publication Data

US 2024/0213825 A1 Jun. 27, 2024

(30) Foreign Application Priority Data

Apr. 29, 2021 (DE) ..................... 10 2021 204 292.9

(51) Int. Cl.
*H02K 11/33* (2016.01)
*B64D 27/30* (2024.01)
(Continued)

(52) U.S. Cl.
CPC ............. *H02K 11/33* (2016.01); *B64D 27/30* (2024.01); *H02K 1/148* (2013.01); *H02K 21/20* (2013.01); *B64D 27/34* (2024.01)

(58) Field of Classification Search
CPC .. H02K 3/12; H02K 3/16; H02K 3/28; H02K 3/48; H02K 3/04; H02K 3/38; H02K 3/40; H02K 21/12; H02K 11/05
See application file for complete search history.

(56) References Cited

U.S. PATENT DOCUMENTS 1,711,979 A * 5/1929 Weinert ................ H02K 17/14
318/773
1,832,700 A * 11/1931 Gay ......................... H02K 3/28
310/198

(Continued)

FOREIGN PATENT DOCUMENTS

CN 108183570 B * 8/2021 ............... H02K 3/46
DE 19740937 A1 3/1999

(Continued)

OTHER PUBLICATIONS

German Search Report dated Apr. 8, 2022 from counterpart German App No. 102021204292.9.

(Continued)

*Primary Examiner* — Maged M Almawri
(74) *Attorney, Agent, or Firm* — SHUTTLEWORTH & INGERSOLL, PLC; Timothy J. Klima

(57) ABSTRACT

A stator for an electric machine comprises: —a body; —a plurality of stator teeth fixed on the body; and—a plurality of tooth windings, which each have a first electrical conductor, which runs from one end portion, via at least one winding portion around at least one stator tooth, to another end portion, and a second electrical conductor, which is electrically insulated from the first electrical conductor and which runs from one end portion, via the at least one winding portion around the same at least one stator tooth, to another end portion; wherein one end portion of each of the first and second electrical conductors of the tooth windings can be or is electrically connected to an inverter, and the (Continued)

other end portions of the first electrical conductors of the tooth windings are electrically interconnected at a star point.

17 Claims, 7 Drawing Sheets

(51) Int. Cl.
*H02K 1/14* (2006.01)
*H02K 21/20* (2006.01)
*B64D 27/34* (2024.01)

(56) References Cited

U.S. PATENT DOCUMENTS

| | | | | | | |
|---|---|---|---|---|---|---|
| 1,862,922 | A | * | 6/1932 | Churchward | H02K 23/02 | 310/188 |
| 2,575,716 | A | * | 11/1951 | Kilgore | H02K 17/14 | 318/771 |
| 3,035,222 | A | * | 5/1962 | Stone | H02K 19/28 | 318/770 |
| 3,308,363 | A | * | 3/1967 | Rawcliffe | H02K 3/28 | 318/773 |
| 3,624,439 | A | * | 11/1971 | Tokutomi | H02K 1/17 | 310/154.25 |
| 3,694,903 | A | * | 10/1972 | Deming | H02K 1/143 | 336/212 |
| 3,728,567 | A | * | 4/1973 | Picmaus | H02K 3/28 | 310/198 |
| 3,749,991 | A | * | 7/1973 | Kuniyoshi | H02K 29/06 | 318/400.41 |
| 3,758,845 | A | * | 9/1973 | MacKelvie | H02K 11/25 | 340/870.31 |
| 3,866,104 | A | * | 2/1975 | Heine | H02K 37/04 | 310/49.43 |
| 3,991,462 | A | * | 11/1976 | Engel | H01F 41/063 | 29/605 |
| 4,079,446 | A | * | 3/1978 | Hertz | H02K 47/30 | 318/769 |
| 4,100,444 | A | * | 7/1978 | Boyd, Jr. | H02K 17/08 | 310/72 |
| 4,117,390 | A | * | 9/1978 | Iwata | H02J 7/1438 | 219/202 |
| 4,144,470 | A | * | 3/1979 | Auinger | H02K 17/14 | 318/773 |
| 4,161,680 | A | * | 7/1979 | Akamatsu | H02K 29/06 | 318/722 |
| 4,216,571 | A | * | 8/1980 | Miller | H02K 15/105 | 29/736 |
| 4,228,384 | A | * | 10/1980 | Arnold, Jr. | H02K 3/26 | 318/400.41 |
| 4,281,450 | A | * | 8/1981 | Bale | H02K 15/067 | 29/736 |
| 4,307,311 | A | * | 12/1981 | Grozinger | H02K 3/28 | 242/432 |
| 4,309,643 | A | * | 1/1982 | Akamatsu | H02P 25/024 | 318/722 |
| 4,338,534 | A | * | 7/1982 | Broadway | H02K 17/14 | 318/773 |
| 4,341,970 | A | * | 7/1982 | Auinger | H02K 3/28 | 318/773 |
| 4,394,596 | A | * | 7/1983 | Kimura | H02K 3/28 | 310/198 |
| 4,532,449 | A | * | 7/1985 | Aoki | H02K 13/06 | 310/154.25 |
| 4,550,267 | A | * | 10/1985 | Vaidya | H02K 21/12 | 310/112 |
| 4,609,862 | A | * | 9/1986 | Becker | H02K 19/34 | 310/198 |
| 4,751,448 | A | * | 6/1988 | Auinger | H02K 3/28 | 318/722 |
| 4,785,213 | A | * | 11/1988 | Satake | H02K 17/36 | 310/116 |
| 4,808,868 | A | * | 2/1989 | Roberts | H02K 3/16 | 310/68 R |
| 4,890,049 | A | * | 12/1989 | Auinger | H02K 3/28 | 310/71 |
| 5,134,332 | A | * | 7/1992 | Nakamura | H02K 17/14 | 310/68 R |
| 5,231,324 | A | * | 7/1993 | Kawamura | H02K 3/28 | 310/198 |
| 5,233,280 | A | * | 8/1993 | Ghosh | H02M 7/537 | 318/400.38 |
| 5,373,619 | A | * | 12/1994 | Fleischhacker | A61M 25/09 | 29/451 |
| 5,449,962 | A | * | 9/1995 | Shichijyo | H02K 3/28 | 310/198 |
| 5,515,264 | A | * | 5/1996 | Stacey | H02M 7/49 | 363/64 |
| 5,559,385 | A | * | 9/1996 | Yalovega | H02K 3/28 | 310/198 |
| 5,614,799 | A | * | 3/1997 | Anderson | H02P 1/32 | 318/776 |
| 5,619,407 | A | * | 4/1997 | Hammond | H01F 30/02 | 363/148 |
| 5,691,590 | A | * | 11/1997 | Kawai | H02K 19/36 | 310/180 |
| 5,714,821 | A | * | 2/1998 | Dittman | H02K 19/28 | 310/179 |
| 5,786,673 | A | * | 7/1998 | Johnson | H02K 3/28 | 318/293 |
| 5,793,139 | A | * | 8/1998 | Nashiki | H02K 19/36 | 310/216.072 |
| 5,821,660 | A | * | 10/1998 | Anderson | H02K 3/28 | 318/400.11 |
| 5,994,802 | A | * | 11/1999 | Shichijyo | H02K 21/044 | 310/263 |
| 5,998,903 | A | * | 12/1999 | Umeda | H02K 3/528 | 310/58 |
| 6,011,332 | A | * | 1/2000 | Umeda | H02K 9/06 | 310/260 |
| 6,097,127 | A | * | 8/2000 | Rivera | H02P 25/188 | 310/179 |
| 6,144,136 | A | * | 11/2000 | Umeda | H02K 3/12 | 310/201 |
| 6,201,332 | B1 | * | 3/2001 | Umeda | H02K 3/12 | 310/179 |
| 6,222,295 | B1 | * | 4/2001 | Umeda | H02K 3/12 | 310/201 |
| 6,249,443 | B1 | * | 6/2001 | Zhou | H01F 30/14 | 363/5 |
| 6,331,760 | B1 | * | 12/2001 | McLane, Jr. | H02K 17/30 | 318/796 |
| 6,340,851 | B1 | * | 1/2002 | Rinaldi | H02P 27/16 | 307/82 |
| 6,385,064 | B1 | * | 5/2002 | Zhou | H02M 7/08 | 363/67 |
| 6,407,476 | B1 | * | 6/2002 | Nishimura | H02K 19/36 | 310/180 |
| 6,411,049 | B1 | * | 6/2002 | Fischperer | B60L 15/005 | 318/135 |
| 6,414,412 | B1 | * | 7/2002 | Hao | H02K 17/06 | 310/179 |
| 6,498,736 | B1 | * | 12/2002 | Kamath | H01F 30/02 | 363/44 |
| 6,501,205 | B1 | * | 12/2002 | Asao | H02K 3/12 | 310/184 |
| 6,570,289 | B1 | * | 5/2003 | Liang | H02P 9/30 | 310/179 |
| 6,617,948 | B2 | * | 9/2003 | Kuroshima | H01F 27/292 | 336/83 |
| 6,750,582 | B1 | * | 6/2004 | Neet | H02K 3/24 | 310/201 |
| 6,777,846 | B2 | * | 8/2004 | Feldner | B60K 6/26 | 903/906 |
| 6,847,185 | B2 | * | 1/2005 | Kume | H02P 23/06 | 318/732 |
| 6,865,796 | B1 | * | 3/2005 | Oohashi | H02K 15/30 | 242/432 |

(56) References Cited

U.S. PATENT DOCUMENTS 6,885,124 B2 * 4/2005 Neet .......... H02K 3/12 310/201
6,940,202 B1 * 9/2005 Chen .......... H02K 3/14 310/180
6,982,884 B1 * 1/2006 Paice .......... H02J 3/1878 363/39
6,995,993 B2 * 2/2006 Sarlioglu .......... H01F 30/02 323/361
6,998,750 B2 * 2/2006 Anma .......... H02K 21/16 310/179
7,075,206 B1 * 7/2006 Chen .......... H02K 3/28 310/179
7,105,974 B2 * 9/2006 Nashiki .......... H02K 21/145 310/156.08
7,170,211 B2 * 1/2007 Chen .......... H02K 3/28 310/184
7,233,506 B1 * 6/2007 Paice .......... H02M 7/043 363/129
7,291,954 B2 * 11/2007 Kashihara .......... H02K 3/505 310/180
7,375,996 B2 * 5/2008 Singh .......... H01F 30/14 363/149
7,386,931 B2 * 6/2008 Neet .......... H02K 15/0433 29/598
7,417,355 B2 * 8/2008 Shichijo .......... H02K 19/34 310/263
7,595,612 B2 * 9/2009 Ganev .......... H02P 9/008 322/54
7,710,081 B2 * 5/2010 Saban .......... H02K 3/28 322/89
7,772,953 B2 * 8/2010 Huang .......... H01F 30/14 363/5
7,796,413 B2 * 9/2010 Furmanczyk .......... H01F 30/14 363/149
7,928,592 B2 * 4/2011 Wagoner .......... H02P 9/26 290/44
7,928,623 B2 * 4/2011 Lacaze .......... H02K 19/34 310/68 E
7,939,959 B2 * 5/2011 Wagoner .......... H02M 7/493 290/55
8,283,831 B1 * 10/2012 Kaminsky .......... H02K 3/28 310/71
8,299,732 B2 * 10/2012 Hoadley .......... H02P 5/74 318/400.26
8,415,845 B2 * 4/2013 Miyachi .......... H02K 11/049 310/71
8,604,655 B1 * 12/2013 Ferran .......... H02K 3/28 310/179
8,879,286 B2 * 11/2014 Lopez-Santillana .......... H02M 1/4225 363/68
9,013,905 B2 * 4/2015 Zeng .......... H01F 30/14 363/126
9,048,764 B2 * 6/2015 Wagoner .......... H02P 29/0241
9,118,231 B2 * 8/2015 Matsubara .......... H02K 3/28
9,124,169 B2 * 9/2015 Garlow .......... H02M 7/08
9,184,591 B2 * 11/2015 Trainer .......... H02J 3/1878
9,853,512 B2 * 12/2017 Trainer .......... H02K 3/48
2001/0006292 A1 * 7/2001 Inaba .......... H02K 3/28 310/112
2001/0011852 A1 * 8/2001 Nakamura .......... H02K 3/34 310/201
2001/0013167 A1 * 8/2001 Maeda .......... H02K 15/0428 29/868
2001/0028202 A1 * 10/2001 Chen .......... H02K 3/28 310/180
2001/0040415 A1 * 11/2001 Asao .......... H02K 9/06 310/201
2001/0040416 A1 * 11/2001 Nakamura .......... H02K 3/12 310/201
2001/0040418 A1 * 11/2001 Higashino .......... H02K 3/38 310/263
2002/0017825 A1 * 2/2002 Oohashi .......... H02K 3/12 310/207
2002/0047445 A1 * 4/2002 Ooiwa .......... H02K 3/30 310/179
2002/0057031 A1 * 5/2002 Ueda .......... H02K 3/18 310/201
2002/0079771 A1 * 6/2002 Taji .......... H02K 3/12 310/201
2002/0096963 A1 * 7/2002 Masegi .......... H02K 3/28 310/180
2002/0125784 A1 * 9/2002 Bramson .......... H02K 3/28 310/184
2002/0190697 A1 * 12/2002 Ferens .......... H02J 3/1878 323/215
2003/0067375 A1 * 4/2003 Hamann .......... H02K 11/014 336/174
2003/0107287 A1 * 6/2003 Nishimura .......... H02K 3/28 310/180
2003/0132680 A1 * 7/2003 Nakamura .......... H02K 3/28 310/180
2003/0193253 A1 * 10/2003 Arimitsu .......... H02P 5/74 310/114
2004/0061400 A1 * 4/2004 Fukushima .......... H02K 3/28 310/198
2004/0090130 A1 * 5/2004 Kaneko .......... H02K 11/33 310/58
2004/0124724 A1 * 7/2004 Ogi .......... H02K 11/05 363/145
2004/0135450 A1 * 7/2004 Kanebako .......... H02K 21/22 310/90.5
2004/0178691 A1 * 9/2004 Sanada .......... H02K 3/38 310/181
2005/0116570 A1 * 6/2005 Edelson .......... H02P 25/22 310/12.01
2005/0135126 A1 * 6/2005 Gazel .......... H02M 7/08 363/67
2005/0212372 A1 * 9/2005 Akita .......... H02K 3/28 310/201
2005/0242676 A1 * 11/2005 Fujikawa .......... H02K 3/28 310/179
2005/0258703 A1 * 11/2005 Kouda .......... H02K 3/28 310/180
2006/0006655 A1 * 1/2006 Kanazawa .......... H02J 7/1492 290/40 B
2006/0097585 A1 * 5/2006 Asano .......... H02K 41/03 310/12.06
2006/0113967 A1 * 6/2006 Dooley .......... H02K 21/046 322/90
2006/0186749 A1 * 8/2006 Strydom .......... H02K 53/00 310/103
2006/0208595 A1 * 9/2006 Bradfield .......... H02K 3/28 310/179
2006/0208839 A1 * 9/2006 Taylor .......... H02K 35/02 335/205
2006/0267440 A1 * 11/2006 Sakai .......... H02K 15/064 310/184
2006/0273686 A1 * 12/2006 Edelson .......... H02K 3/46 310/83
2007/0018525 A1 * 1/2007 Cai .......... B60L 50/16 310/201
2007/0200535 A1 * 8/2007 Trainer .......... H02H 7/06 322/45
2007/0278797 A1 * 12/2007 Flannery .......... F03D 7/0284 290/44
2008/0012444 A1 * 1/2008 Hattori .......... H02K 3/28 310/198
2008/0067984 A1 * 3/2008 Anghel .......... H02K 16/04 290/31
2008/0129137 A1 * 6/2008 Edelson .......... H02K 3/28 310/159
2008/0278102 A1 * 11/2008 Taniguchi .......... H02P 31/00 318/400.27
2008/0315705 A1 * 12/2008 Obata .......... B60L 50/61 903/906
2009/0121575 A1 * 5/2009 Wolf .......... H02K 3/28 310/263

(56) References Cited

U.S. PATENT DOCUMENTS

2009/0159348 A1* 6/2009 Oyobe .................... B60L 50/61
318/803
2009/0322082 A1* 12/2009 Wagoner ............... H02M 5/458
290/44
2009/0322167 A1* 12/2009 Ishizuka .................. H02K 3/50
310/54
2010/0219788 A1* 9/2010 Edelson .................. H02P 25/22
318/801
2010/0264772 A1* 10/2010 Aoyama ................ H02K 23/34
310/195
2010/0289373 A1* 11/2010 Nishiyama ........... H02K 21/222
310/195
2011/0095638 A1* 4/2011 Sakata ................... H02K 23/20
310/179
2011/0140421 A1* 6/2011 Scholte-Wassink .... H02P 25/18
322/23
2011/0216564 A1* 9/2011 Swamy ............... H02M 1/4216
363/126
2011/0254284 A1* 10/2011 Catucci .................. H01R 39/36
290/1 R
2012/0025658 A1* 2/2012 Watanabe .......... H02K 15/0431
310/179
2012/0139380 A1* 6/2012 Taniguchi .............. H02K 21/14
310/156.48
2012/0223611 A1* 9/2012 Watanabe ................ H02K 1/26
29/603.01
2013/0015742 A1* 1/2013 Inoue ....................... H02K 3/28
310/208
2013/0076190 A1* 3/2013 Jarvinen .................. H02K 3/28
310/198
2013/0154428 A1* 6/2013 Sakuma ................... H02K 3/28
310/207
2013/0221793 A1* 8/2013 Minoshima .............. H02K 3/28
310/207
2014/0133196 A1* 5/2014 Trainer ..................... H02J 3/36
363/35
2014/0139168 A1* 5/2014 Trainer ................. H02J 3/1878
318/500
2014/0265711 A1* 9/2014 Koshino .................. H02K 3/28
310/198
2014/0265745 A1* 9/2014 Maki-Ontto ............. H02K 3/18
310/68 D
2014/0284932 A1* 9/2014 Sharkh ................. H02K 49/102
290/54
2014/0293668 A1* 10/2014 Trainer ............... H02M 7/4835
363/71
2014/0313800 A1* 10/2014 Swamy ................... H02M 7/08
363/126
2015/0035395 A1* 2/2015 Trainer .................. H02K 21/12
310/71
2015/0171693 A1* 6/2015 Sakaue .................... H02K 3/38
310/215
2016/0013649 A1* 1/2016 Jasim ........................ H02J 3/36
363/35
2016/0190884 A1* 6/2016 Nakamura ............... H02K 1/12
310/208
2016/0241127 A1* 8/2016 Jasim ...................... H02M 1/14
2016/0248341 A1* 8/2016 Trainer ................... H02M 1/08
2020/0244127 A1* 7/2020 Birkmayer ............. H02K 11/20
2020/0339010 A1 10/2020 Villaneuva et al.
2023/0018916 A1* 1/2023 Trainer ............... H02M 1/4216

FOREIGN PATENT DOCUMENTS

DE 10033466 A1 11/2001
DE 102014115929 A1 5/2016
DE 102017217751 A1 4/2019
DE 112019001881 12/2021
WO 2012052817 A1 4/2012
WO 2014136166 A1 9/2014
WO WO-2019068542 A1 * 4/2019 ............. H02K 21/16
WO 2020115418 A1 6/2020

OTHER PUBLICATIONS

International Search Report dated Aug. 26, 2022 from counterpart PCT App No. PCT/EP2022/061229.

* cited by examiner

STATOR FOR AN ELECTRIC MACHINE WITH ELECTRICAL CONDUCTORS CONNECTED IN A STAR POINT, AIRCRAFT

This application is the National Phase of International Application PCT/EP2022/061229 filed Apr. 27, 2022 which designated the U.S.

This application claims priority to German Application No. 10 2021 204 292.9 filed Apr. 29, 2021, which application is incorporated by reference herein.

The present disclosure relates in particular to a stator for an electric machine, to an electric machine having such a stator and to an aircraft having such an electric machine.

Such stators comprise a body, e.g. in the form of a laminated core, a plurality of stator teeth anchored on the body, and a plurality of tooth windings wound around the stator teeth. Electric machines having such a stator comprise, e.g., a rotor, for example a permanently excited rotor, which is rotatable relative to the stator. Applying voltages to the tooth windings, in particular temporally variable voltages, causes magnetic fields to build up, which magnetic fields move the rotor relative to the stator.

Especially in polyphase rotating-field machines, in particular having a permanently excited rotor, it proves to be problematic if a short circuit between turns occurs inside the stator winding. In particular in such electric machines, the problem exists that, in the event of a short circuit between turns during intended operation, a large electrical current can be induced, which current can result in thermal destruction of the tooth windings. This is particularly relevant not only, but particularly, in aircraft in which, e.g., permanently excited rotating-field machines are used.

DE 10 2017 217 751 A1 proposes an electric machine in which a respective winding of a stator tooth has a first electrical conductor which describes a plurality of turns arranged circumferentially around the stator tooth, and a second electrical conductor which is electrically insulated from said first electrical conductor and has a plurality of turns arranged circumferentially around the respective stator tooth. This makes it possible to considerably improve electrical safety with respect to short circuits in the region of the stator winding. However, the design of this electric machine is relatively complex.

The object of the present invention is to specify a further improved stator for an electric machine.

According to one aspect, there is provision for a stator for an electric machine. The stator comprises a body, e.g. in the form of a laminated core, a plurality of stator teeth anchored on the body, and a plurality of, e.g. at least three, tooth windings. Each of the tooth windings comprises a first electrical conductor which runs from one end portion, via at least one winding portion around at least one stator tooth (or via a plurality of winding portions around one of a plurality of stator teeth in each case), to another end portion. Each of the tooth windings further comprises a second electrical conductor which is electrically insulated from the first electrical conductor and which runs from one end portion, via the at least one winding portion around the same at least one stator tooth (or on a plurality of winding portions around each of the same stator teeth), to another end portion. In this case, there is provision for one end portion of each of the first and second electrical conductors of the plurality of tooth windings to be or able to be electrically connected to an inverter. Furthermore, there is provision for the respective other end portion of the first electrical conductors of the tooth windings to be electrically connected to one another at a (first) star point.

Such an electrical connection of the tooth windings formed by the two electrical conductors electrically insulated from one another makes it possible to use half-bridge inverters instead of full-bridge inverters, which despite the high degree of safety achieved with respect to short circuits allows for an electric machine with a relatively simple design. The stator is thus in particular improved in that an electric machine which is safe and which nevertheless has a simple design is therefore made possible.

Each of the first and second electrical conductors has exactly two end portions and establishes a direct, continuous electrical connection between the two end portions. The electrical conductor comprises the winding portions between the two end portions of the respective electrical conductor. The electrical conductor comprises, e.g., no tap between the two end portions of the respective electrical conductor. At least three electrical conductors meet one another at the star point. The star point forms a tap. The first electrical conductors of the tooth windings are electrically isolated from the second electrical conductors of the tooth windings. The first electrical conductors and the second electrical conductors are electrically insulated from one another.

The stator comprises, e.g., at least (in particular exactly) three tooth windings, each for one phase of a three-phase AC current. The stator thus comprises, e.g., six (first and second) electrical conductors in total.

All the first electrical conductors of each of the tooth windings are electrically connected to one another at a first star point. Optionally, (the respective other ends facing away from the inverter of) all the second electrical conductors of each of the tooth windings are electrically connected to one another at a second star point.

Turns of the first and second electrical conductors are arranged in a bifilar manner. Seen along the turn axis, the first and second conductors alternate, for example. Due to the fact that the turns of the first and second electrical conductors are arranged in a bifilar manner, a short circuit between turns may thus initially occur between the first and second electrical conductors. If an electrical charge is applied to the tooth winding elements formed by the first and second electrical conductors, it is thus possible to considerably reduce the effect of a short circuit between turns. It is even possible to identify the short circuit between turns and to shut down the electric machine in a safe manner in order to avoid dangerous operating states.

For example, each of the first electrical conductors of the tooth windings runs around each of a plurality of stator teeth and/or each of the second electrical conductors of the tooth windings runs around each of a plurality of stator teeth, in particular in each case around the same stator teeth as the associated first electrical conductor.

According to one aspect, there is provision for an electric machine. The electric machine comprises the stator according to any configuration described herein. The electric machine can further comprise a rotor which is mounted movably, in particular rotatably, relative to the stator.

In the electric machine, the stator provides, e.g., a substantially circular opening for accommodating the rotor. The rotor is arranged in the opening, e.g., in a rotatably mounted manner, wherein an air gap is formed between the rotor and the stator. This type of construction is also referred to as an internal rotor. Alternatively, there is provision for a type of construction in which the rotor radially surrounds the stator. Such types of construction are also called external rotors.

The electric machine is an apparatus which converts electrical energy into mechanical energy, in particular kinetic energy, in a motor mode, and/or mechanical energy into electrical energy in a generator mode. The movement is, e.g., a rotational movement performed by the rotor. The stator is, e.g., arranged in a rotationally fixed manner with respect to a mount bearing the electric machine. A rotational movement is therefore in particular a rotational movement of the rotor in relation to the stator.

The electric machine is operable as a motor and/or as a generator.

Furthermore, the electric machine can be operable as a transformer. The electric machine is then thus designed for use as a transformer. In particular, the electric machine can be operated as a transformer and simultaneously as a motor and/or generator.

The electric machine can comprise a first inverter and a second inverter. The first inverter and the second inverter can be designed such that they can be operated independently of the respective other inverter. This allows increased fail-safety.

Optionally, the first inverter is electrically connected to the first electrical conductors of each of the tooth windings, and/or the second inverter is electrically connected to the second electrical conductors of each of the tooth windings.

For example, the first inverter and the second inverter are configured to provide the same electrical phase of a polyphase AC voltage, in particular three-phase AC voltage, on the first and second electrical conductors of the respective tooth windings in an electrically isolated manner. The phases of the two inverters can, but do not have to, be synchronized with one another and are asynchronous in an alternative configuration.

The electric machine can further comprise a first energy source (and/or an energy store, e.g. an accumulator) which is electrically connected to the first inverter, and/or a (second) energy source (and/or an energy store, e.g. an accumulator) which is electrically connected to the second inverter. The respective energy source provides electrical energy to the respective inverter. This allows further increased fail-safety. Alternatively or in addition, the electric machine can further comprise an energy source which is electrically connected to the first inverter, and/or an energy store which is electrically connected to the second inverter. The energy source provides electrical energy to the respective inverter. The energy store draws electrical energy. This allows energy from the energy source connected to the first inverter to be reallocated to the energy store connected to the second inverter. This reallocation allows balanced energy states of the energy source and the energy store to be established.

The first energy source (and/or a first energy store) is electrically isolated from the second energy source (and/or the second energy store). This allows the first and second electrical conductors of the tooth windings to be operated independently.

The first inverter and/or the second inverter can each have a plurality of, in particular three, inverter units, e.g. each for one electrical phase of a polyphase AC voltage, in particular a three-phase AC voltage. Each of the inverter units comprises (or consists of), e.g., a half-bridge circuit.

According to one aspect, there is provision for a vehicle, in particular an aircraft, comprising the electric machine according to any configuration described herein, in particular for driving a thrust-generating apparatus, e.g. a propeller. As already mentioned at the outset, the advantages of the electric machine described herein apply especially to a vehicle, in particular an aircraft.

Embodiments will now be described by way of example with reference to the figures, in which.

Figure 1:
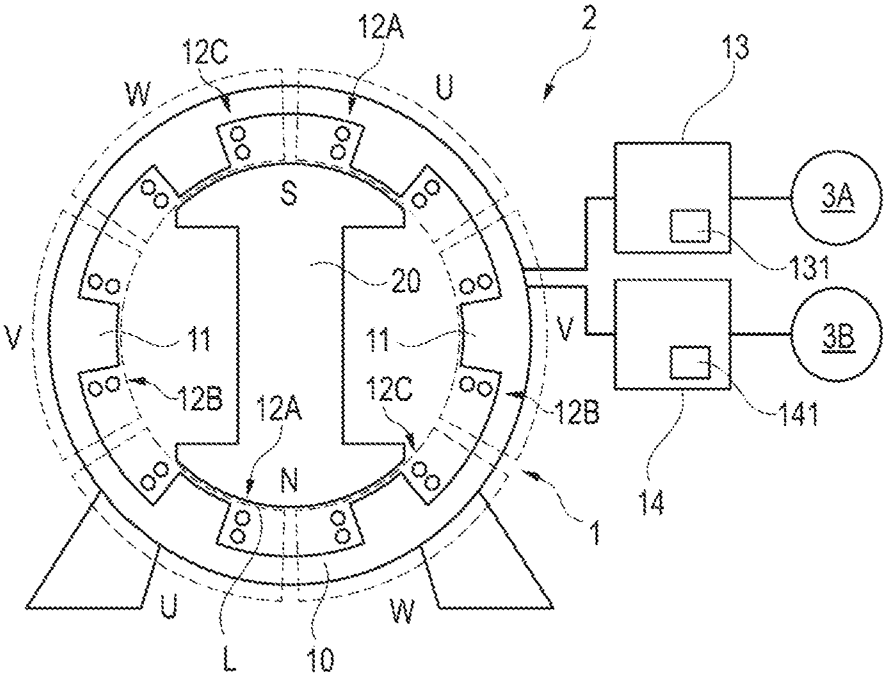
FIG. 1 shows a schematic sectional illustration of a basic design of a permanently excited, three-phase electric machine in the form of an internal rotor.

FIG. 1 shows a schematic sectional illustration of a rotating electric machine 2 in the form of a permanently excited synchronous machine. It can be seen from FIG. 1 that the electric machine 2 in the present case is in the form of an internal rotor. The electric machine 2 comprises a stator 1 which has an opening, in particular a through-opening, which is not denoted, in which a rotor 20 is arranged in a rotatably mounted manner.

The stator 1 comprises a body 10 in the form of a laminated core, on which stator teeth 11 are provided with respect to an air gap L between the body 10 of the stator 1 and the rotor 20. The stator teeth 11 protrude radially from the body 10, in the present case radially inward. The stator 1 has a stator winding which comprises a plurality of tooth windings 12A-12C. The stator winding in the present case is designed for three-phase operation, that is to say is connected to a three-phase AC voltage having phases U, V, W. During intended operation of the electric machine 2, the AC voltage is applied to the stator winding as appropriate.

The rotor 20 in the present case is in the form of a salient-pole rotor which comprises permanent magnets for providing the magnetic flux. In the present configuration, there is provision for the rotor 20 to have exactly one magnetic north pole N and one magnetic south pole S. In alternative configurations, there can also be provision for more magnetic poles in alternation in the circumferential direction transverse to an axis of rotation of the rotor 20 (relative to the stator 1).

The rotor 20 is rotatably mounted. As a result of the three-phase AC voltage, the phases U, V, W thereof each being phase-shifted by 120°, a magnetic rotating field is generated during intended operation, which magnetic rotating field interacts with the permanently excited magnetic field provided by the rotor 20 such that a corresponding rotational movement of the rotor 20 in relation to the stator 1 can be brought about in motor mode. In the present case, provision is made for the electric machine 2 to be used as a drive motor for a propeller of an aircraft. Alternatively or in addition, the electric machine 2 can be used as a generator for a propeller (for regeneration) of an aircraft, of a wind turbine or turbine or of a piston engine or else for the hybrid drive of an airplane. Alternatively or in addition, the electric machine 2 can also be used as a transformer. For this case, the rotor 20 can rotate or remain stationary in the electric machine 2. Alternatively or in addition, the electric machine 2 can also be used as a drive motor, generator and transformer (as required in each case). The portions of the stator winding which are assigned to the respective phases U, V, W are schematically illustrated in FIG. 1. One of the tooth windings 12A-12C is in each case respectively assigned to one of the phases U, V, W.

The stator winding of the electric machine 2 is connected to two inverters 13A, 13B which are independent of one another and each have a three-phase design. The inverters 13A, 13B provide the AC voltage having the three phases U, V, W. The inverters 13A, 13B draw the electrical energy required for the intended operation in each case from an energy source 3A, 3B connected to one of the two inverters 13A, 13B. The energy sources (or energy stores) 3A, 3B are electrically isolated from one another and are operable independently of one another. In the present configuration, each of the energy sources 3A, 3B is a DC voltage source which provides electrical energy from a suitable electrical energy store, for example an accumulator or the like, or which stores electrical energy in a suitable electrical energy store, for example an accumulator or the like. Alternatively or additionally, fuel cells and/or the like or, in the case of stationary applications, an energy supply from a public energy supply network may also be provided as the source.

The inverters 3A, 3B have inverter units assigned for providing the phases U, V, W, which inverter units are explained in more detail further below in connection with FIG. 5, for example. In this case, each inverter unit has its own half-bridge circuit. The half-bridge circuits are connected to a DC link circuit, which is not illustrated any further in FIG. 1, of the respective inverter 3A, 3B in order to thus be supplied with electrical energy or to thus supply electrical energy. The DC link circuits can have a voltage of 25 V or more, of 100 V or more or e.g. in the range from 800 to 3000 V.

It is noted here that the half-bridge circuit has a series circuit comprising two electronic switching elements (e.g. transistors) which are connected to the respective link circuit DC voltage of the inverter 3A, 3B. The electronic switching elements are operated by a control unit 131, 141 of the respective inverter in a clock mode which provides clock patterns in the form of a PWM signal, for example. The corresponding phase U, V, W of the three-phase AC voltage is then available at a respective center tap of the half-bridge circuits. Appropriate filtering is carried out by the inductance of the tooth windings 12A-12C, with the result that an appropriate AC current is obtained for each of the phases U, V, W, which AC current can be virtually sinusoidal if the inverter units are suitably controlled.

For the sake of simplicity, the inverters 3A, 3B are counted as part of the electric machine 2 here, but together therewith can also be referred to as an electric drive device.

Figure 2:
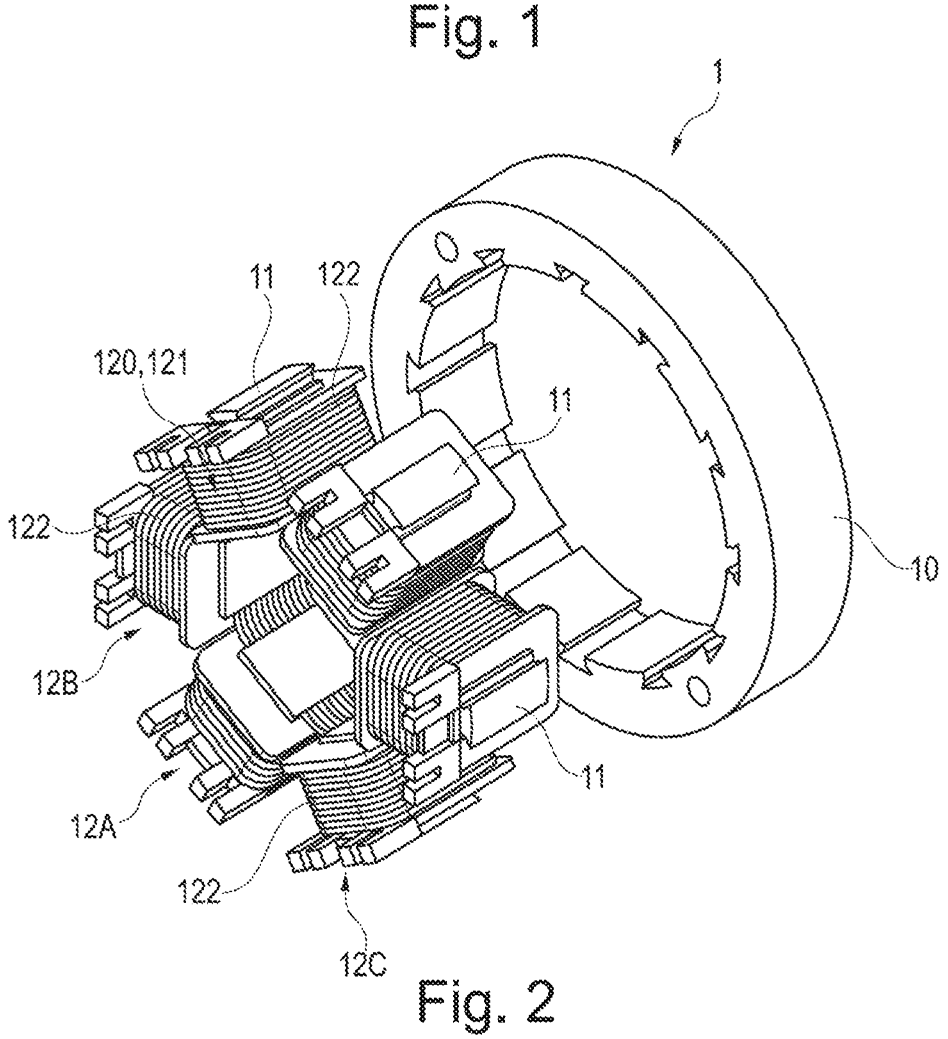
FIG. 2 shows a schematic, perspective exploded view of a design of a stator of the electric machine according to FIG. 1 with tooth windings.

FIG. 2 shows a schematic exploded illustration of the stator 1 of the electric machine 2. It can be seen that the stator 1 has the body 10, in which stator teeth 11 can be assembled with the annular body 10 by means of a mechanical connection and can thus be anchored, in particular mechanically fixed, thereon. Alternatively, the stator teeth 11 are, e.g., formed in one piece with the body 10.

The stator teeth 11 are fitted with respective winding portions 122 of the tooth windings 12A-12C. The stator winding has a plurality of tooth windings 12A-12C. A respective one of the tooth windings 12A-12C is generally arranged at least on one of the stator teeth 11. In the present case, each of the tooth windings 12A-12C extends over a plurality of, here two (specifically two opposite), stator teeth 11. For this purpose, the tooth windings 12A-12C generally each have at least one, here a plurality of, namely two, winding portions 122. Each winding portion 122 surrounds (exactly) one stator tooth 11.

Each of the tooth windings 12A-12C has a respective first electrical conductor 120 which, on each of the winding portions 122, is arranged in a plurality of turns circumferentially around the respective stator tooth 11. The first electrical conductor 120 comprises one or more corresponding connecting portions between the winding portions 122.

Each of the tooth windings 12A-12C further has a respective second electrical conductor 121 which, on each of the winding portions 122, is likewise arranged in a plurality of turns circumferentially around the respective stator tooth 11. The second electrical conductor 121 comprises one or more corresponding connecting portions between the winding portions 122.

The tooth windings 12A-12C are connected up in the electric machine as appropriate such that the three-phase connection to the inverters 13, 14 is present. In this case, the first electrical conductors 120 of the tooth windings 12A-12C are connected to the first inverter 13, and the second electrical conductors 121 of the tooth windings 12A-12C are connected to the second inverter 14.

Figure 3:
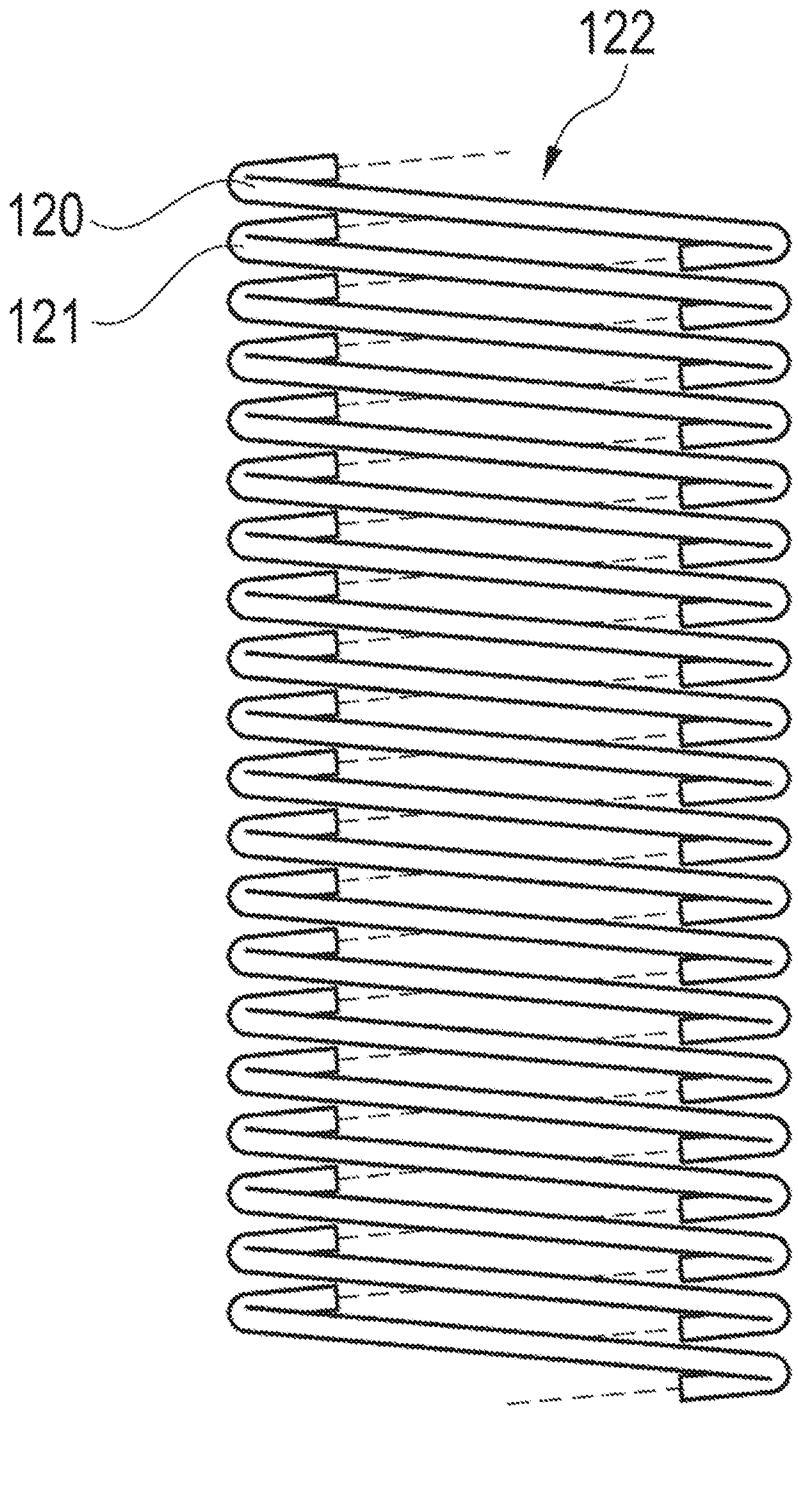
FIG. 3 shows a schematic illustration of part of a tooth winding of the stator according to FIG. 2, in which turns of a first and second electrical conductor are arranged in a bifilar manner.

FIG. 3 shows a schematic illustration of a winding portion 122 of one of the tooth windings 12A-12C. The first electrical conductor 120 in this case is wound around the stator tooth 11, which is not illustrated in FIG. 3. In the present instance, the winding is in the form of an elongated coil. Depending on the configuration and design, there can also be provision for a multilayer winding to be provided in order to be able to achieve, for example, a correspondingly high magnetic potential with a predefined electrical current.

Furthermore, the winding portion 122 of the tooth winding 12A-12C comprises the respective second electrical conductor 121, which is electrically insulated from the first electrical conductor 120. The second electrical conductor 121 also has a plurality of turns arranged circumferentially around the same stator tooth 11. The respective turns of the first and second electrical conductors 120, 121 are arranged in a bifilar manner. That is to say that one turn of the first electrical conductor 120 is always respectively arranged between two adjacent turns of the second electrical conductor 121 (and vice versa) in the longitudinal extent of the winding portion 122. This has the advantage that, in the event of a short circuit between two adjacently arranged turns, the short circuit always occurs between the first electrical conductor 120 and the second electrical conductor 121. A short circuit thus does not occur inside a winding of the same electrical conductor. This makes it possible to prevent large currents in the case of a short circuit between turns, and therefore large thermal and electrical stresses.

Figure 4:
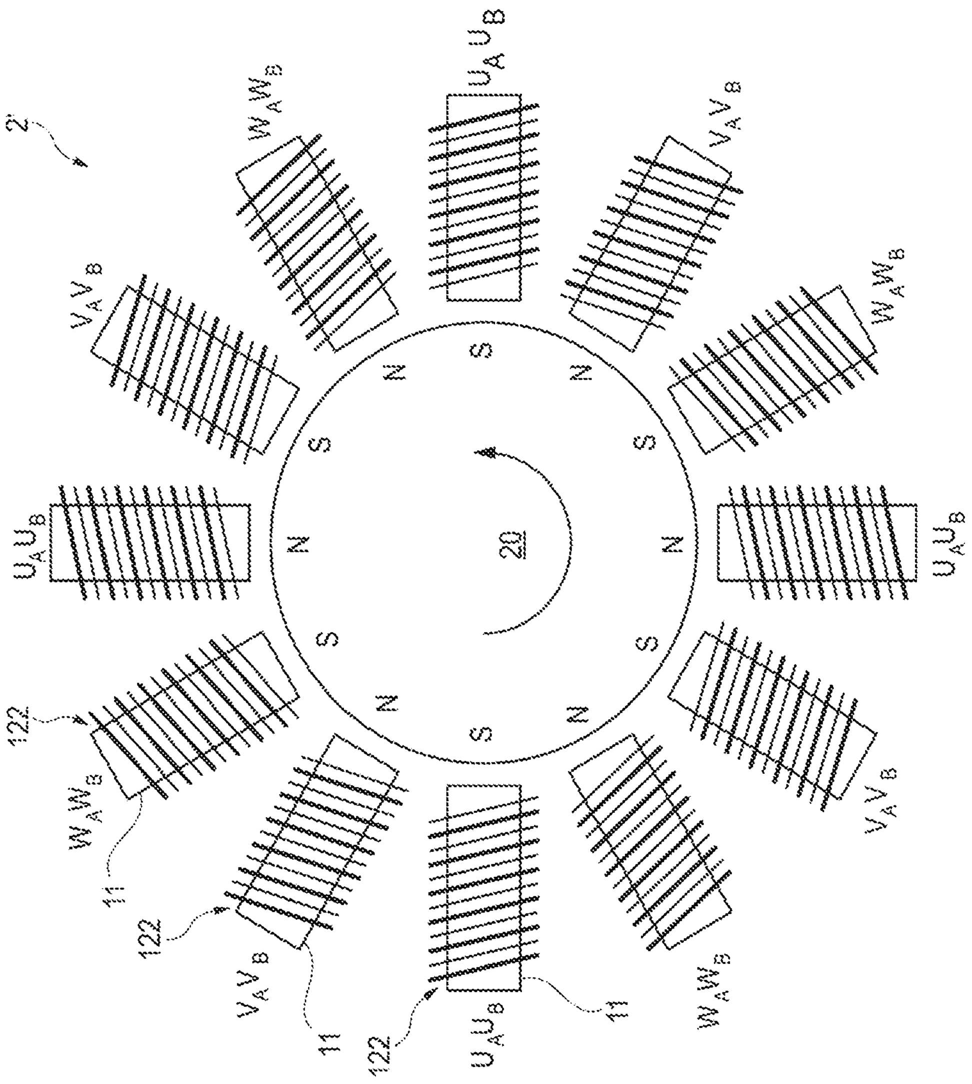
FIG. 4 shows a schematic illustration of a permanently excited electric machine for operation at a three-phase AC voltage.

FIG. 4 shows a schematic illustration of an electric machine 2' in the form of a synchronous machine which, in contrast to the electric machine 2 according to FIGS. 1 and 2, now has a twelve-pole rather than a six-pole design. The corresponding stator therefore has twelve stator teeth 11. These are arranged equidistantly in the circumferential direction in the present case. The rotor 20 is again arranged in a through-opening formed through the stator, which rotor likewise has a twelve-pole design in this configuration and therefore provides six north poles N and six south poles S arranged in alternation in the circumferential direction. Here too, there is provision for the magnetic flux provided by the rotor 20 to be provided by permanent magnets arranged, e.g., in the region of the outer circumference of the rotor 20.

Here too, each of the stator teeth 11 is equipped with a winding portion 122 of one of the three tooth windings. Each of the three tooth windings again has a respective first electrical conductor and a respective second electrical conductor (illustrated by different line thicknesses in FIG. 4 purely for the purposes of illustration) which are wound onto the respective stator teeth 11 in a bifilar manner in this configuration. This electric machine 2' is likewise designed to be supplied with a three-phase AC voltage, each of the phases again being denoted using U, V, W.

Figure 5:
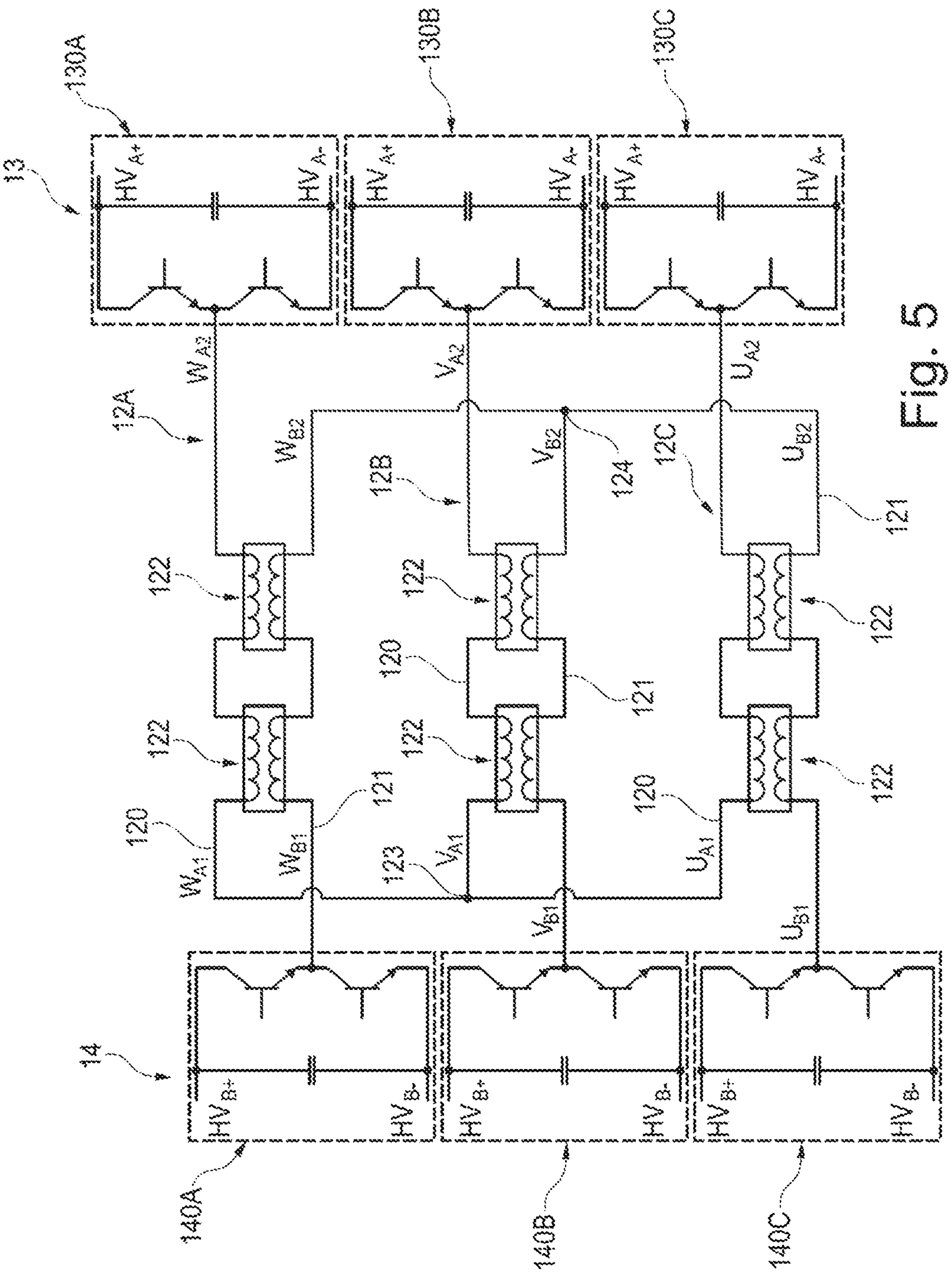
FIGS. 5 and 6 show schematic circuit diagram illustrations of tooth windings and inverters of the electric machine according to FIG. 2 and FIG. 4, respectively.

FIG. 5 shows an electrical interconnection of the tooth windings 12A-12C and the inverters 13, 14 of the electric machine 2 according to FIG. 1.

The two inverters 13, 14 each comprise three inverter units 130A-130C, 140A-140C, one for each one of the three phases U, V, W. As already described, each inverter unit 130A-130C, 140A-140C has its own half-bridge circuit. An optional capacitor is used as a low-pass filter in each case.

A first DC voltage is applied to the inverter units 130A-130C of the first inverter 13 (designated by HVA+ and HVA−). A second DC voltage is applied to the inverter units 140A-140C of the second inverter 14 (designated by HVB+ and HVB−). The first and second DC voltages are optionally identical and alternatively are different. For example, the first and second DC voltages are 25 V or more, 100 V or more or 800 to 3000 V.

In this case, all six winding portions 122 for the six stator teeth 11 are shown, each winding of the first and second electrical conductors 120, 121 being illustrated only schematically.

Initially, the tooth winding 12A for a first phase W will be considered. The tooth winding 12A comprises a first electrical conductor 120 and a second electrical conductor 121. Both electrical conductors 120, 121 extend over winding portions 122 on the same (two) stator teeth 11 but are electrically insulated from one another. Both electrical conductors 120, 121 have two end portions WA1, WA2, WB1, WB2. Both electrical conductors 120, 121 are free of taps between their end portions WA1, WA2, WB1, WB2. The electrical conductors 120, 121 each establish an electrical connection between the respective two end portions WA1, WA2, WB1, WB2. The winding portions 122 of the tooth winding 12A lie between the end portions WA1, WA2, WB1, WB2 of the electrical conductors 120, 121.

The end portions of the first electrical conductor 120 of the tooth winding 12C for a first phase W are denoted using WA1 and WA2. One end portion WA2 of the first electrical conductor 120 is electrically connected to the first inverter 13 (specifically to a first inverter unit 130A thereof), and the other end portion WA1 of said first electrical conductor is electrically connected to a first star point 123.

The end portions of the second electrical conductor 121 of the tooth winding 12C for the first phase W are correspondingly denoted using WB1 and WB2. One end portion WB1 of the second electrical conductor 121 is electrically connected to the second inverter 14 (specifically to a first inverter unit 140A thereof), and the other end portion WB2 of said second electrical conductor is electrically connected to a second star point 124.

The end portions of the first electrical conductor 120 of the tooth winding 12B for a second phase V are denoted using VA1 and VA2. One end portion VA2 of the first electrical conductor 120 is electrically connected to the first inverter 13 (specifically to a second inverter unit 130B thereof), and the other end portion VA1 of said first electrical conductor is electrically connected to the first star point 123.

The end portions of the second electrical conductor 121 of the tooth winding 12B for the second phase V are correspondingly denoted using VB1 and VB2. One end portion VB1 of the second electrical conductor 121 is electrically connected to the second inverter 14 (specifically to a second inverter unit 140B thereof), and the other end portion VB2 of said second electrical conductor is electrically connected to the second star point 124.

The end portions of the first electrical conductor 120 of the tooth winding 12C for a third phase U are denoted using UA1 and UA2. One end portion UA2 of the first electrical conductor 120 is electrically connected to the first inverter 13 (specifically to a third inverter unit 130C thereof), and the other end portion UA1 of said first electrical conductor is electrically connected to the first star point 123.

The end portions of the second electrical conductor 121 of the tooth winding 12C for the third phase U are correspondingly denoted using UB1 and UB2. One end portion UB1 of the second electrical conductor 121 is electrically connected to the second inverter 14 (specifically to a third inverter unit 140C thereof), and the other end portion UB2 of said second electrical conductor is electrically connected to the second star point 124.

Figure 6:
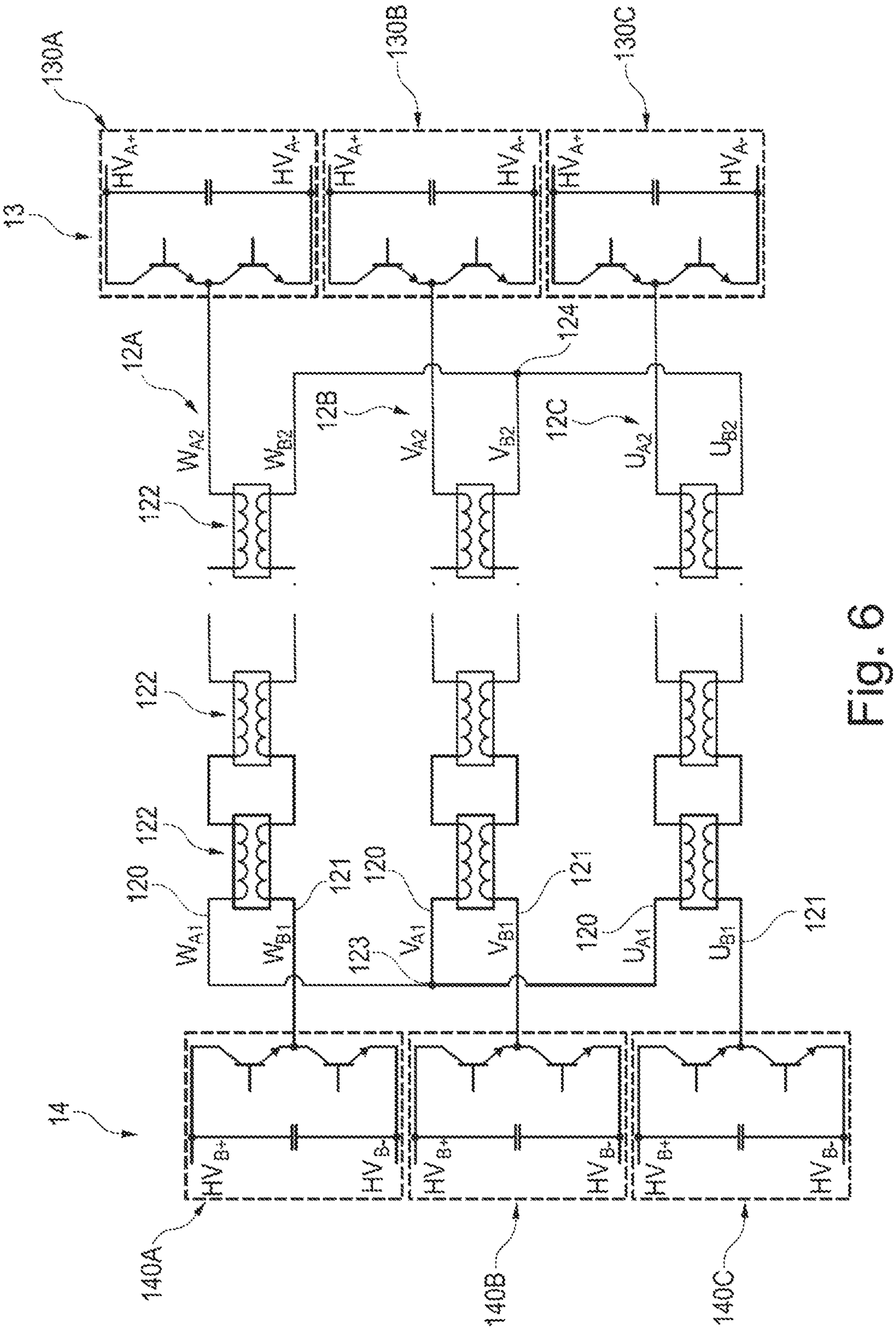

FIG. 6 shows essentially the same interconnection as FIG. 5, but more winding portions 122 are illustrated. It can be seen that the tooth windings 12A-12C can have a smaller or larger number of winding portions 122 depending on the application, e.g. in total six (cf. in particular FIGS. 2 and 5), twelve (cf. in particular FIG. 4) or 18.

While the tooth windings 12A-12C are arranged between the inverters 13, 14 according to FIGS. 5 and 6, it is pointed out that this arrangement is only exemplary.

Furthermore, it can be seen that in FIGS. 5 and 6 the end portions, connected to the inverters 13, 14, of the first and second conductors 120, 121 of each individual one of the tooth windings 12A-12C face away from one another with respect to the common winding portions 122.

Figure 7:
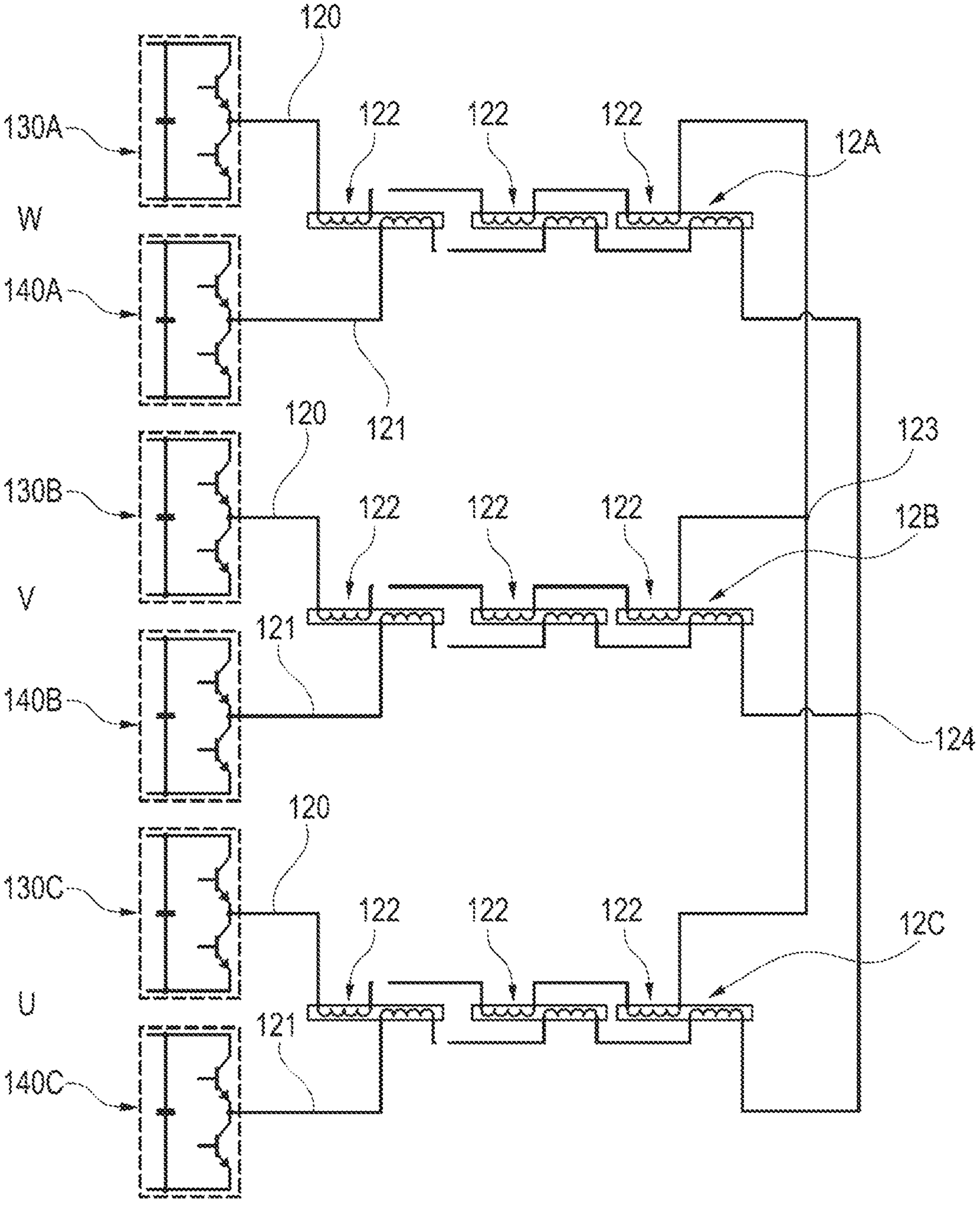
FIG. 7 shows another schematic circuit diagram illustration of tooth windings and inverters.

FIG. 7 shows a modified arrangement in this regard. The end portions of the first and second electrical conductors 120, 121 of each individual one of the tooth windings 12A-12C accordingly originate from the same winding portion 122 (and also from the same end of the winding portion 122).

Figure 8:
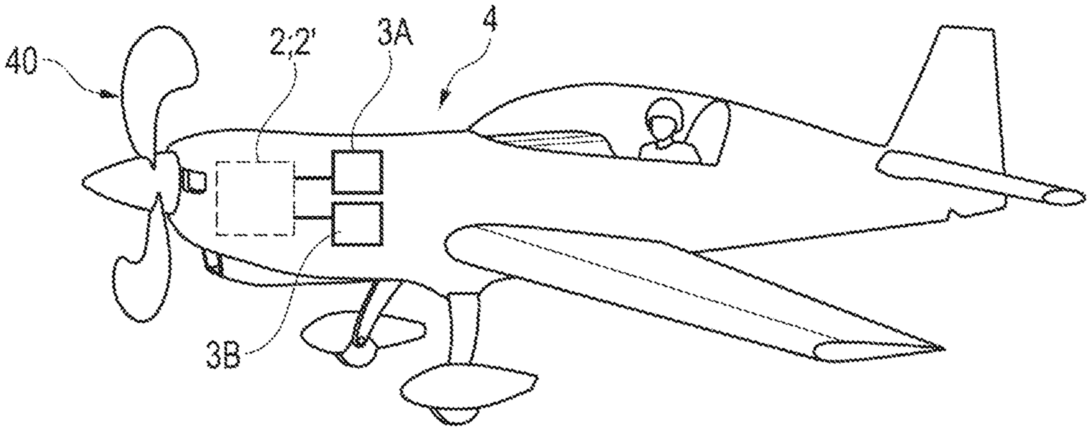
FIG. 8 shows an aircraft in the form of an airplane having an electrically driven propeller and the electric machine according to FIG. 1.

FIG. 8 shows an aircraft 4 in the form of an electrically driven airplane. The aircraft 4 comprises a propeller 40 which is driven by the above-described electric machine 2 according to FIG. 2 (alternatively by the electric machine 2' according to FIG. 4).

The aircraft 4 further comprises two energy sources (and/or energy stores) 3A, 3B, each in the form of an electric battery or of a generator driven, e.g., by a turbine or a piston engine. Such a generator is in particular also in the form of the electric machine 2 described herein. The electric machine 2 is supplied with energy by the energy sources 3A, 3B, or supplies the latter with energy, wherein one energy source 3A is electrically connected to the first inverter 13 while the other energy source 3B is connected to the second inverter 14.

It goes without saying that the invention is not limited to the embodiments described above, and various modifications and improvements can be made without departing from the concepts described here. Any of the features may be used separately or in combination with any other features, unless they are mutually exclusive, and the disclosure extends to and includes all combinations and subcombinations of one or more features that are described herein.

LIST OF REFERENCE SIGNS

1 stator
10 body
11 stator tooth
12A-12C tooth winding
120 first electrical conductor
121 second electrical conductor
122 winding portion
123 first star point
124 second star point
13 first inverter
130A-130C inverter unit
131 control unit
14 second inverter
140A-140C inverter unit
141 control unit
2; 2' electric machine
20 rotor
3A, 3B energy source
4 aircraft
40 propeller
L air gap
N north pole
S south pole
U, V, W phase

The invention claimed is:

1. A stator for an electric machine, comprising:
a body;
a plurality of stator teeth anchored on the body, and
a plurality of tooth windings which each have a first electrical conductor which runs from one end portion, via at least one winding portion around at least one stator tooth, to another end portion, and a second electrical conductor which is electrically insulated from the first electrical conductor and which runs from one end portion, via the at least one winding portion around the at least one stator tooth, to another end portion,
wherein the one end portion of each of the first and second electrical conductors of the tooth windings is electrically connected to an inverter, and the other end portions of the first electrical conductors of the tooth windings are electrically connected to one another at a star point,
wherein the stator comprises exactly three tooth windings, each for one phase of a three-phase AC current.

2. The stator as claimed in claim 1, wherein the other end portions of the second electrical conductors of the tooth windings are electrically connected to one another at a second star point.

3. The stator as claimed in claim 1, wherein turns of the first and second electrical conductors are arranged in a bifilar manner.

4. The stator as claimed in claim 1, wherein each of the first electrical conductors of the tooth windings runs around a plurality of stator teeth in each case and each of the second electrical conductors of the tooth windings runs around the plurality of stator teeth in each case.

5. The stator as claimed in claim 1, wherein the first electrical conductors and the second electrical conductors of the respective tooth windings each form a transformer.

6. An electric machine comprising the stator as claimed in claim 1 and a rotor which is mounted rotatably relative to the stator.

7. The electric machine as claimed in claim 6, configured to be operable as a motor and/or as a generator.

8. The electric machine as claimed in claim 6, configured to be operable as a transformer.

9. An aircraft comprising the electric machine as claimed in claim 7.

10. The electric machine as claimed in claim 6, and further comprising a first inverter and a second inverter.

11. The electric machine as claimed in claim 10, wherein the first inverter and the second inverter each have a plurality of inverter units.

12. The electric machine as claimed in claim 10, wherein the first inverter is electrically connected to the first electrical conductors of each of the tooth windings, and the second inverter is electrically connected to the second electrical conductors of each of the tooth windings.

13. The electric machine as claimed in claim 12, wherein the first inverter and the second inverter are configured to provide a same electrical phase of a polyphase AC voltage on the first and second electrical conductors of the respective tooth windings in an electrically isolated manner.

14. The electric machine as claimed in claim 10, and further comprising a first energy source and/or energy store which is electrically connected to the first inverter, and a second energy source and/or energy store which is electrically connected to the second inverter.

15. The electric machine as claimed in claim 14, wherein the two energy sources and/or energy stores are electrically isolated from one another.

16. An electric machine comprising:
a stator, comprising:
a body;
a plurality of stator teeth anchored on the body, and
a plurality of tooth windings which each have a first electrical conductor which runs from one end portion, via at least one winding portion around at least one stator tooth, to another end portion, and a second electrical conductor which is electrically insulated from the first electrical conductor and which runs from one end portion, via the at least one winding portion around the at least one stator tooth, to another end portion,
wherein the one end portion of each of the first and second electrical conductors of the tooth windings is electrically connected to an inverter, and the other end portions of the first electrical conductors of the tooth windings are electrically connected to one another at a star point,
a rotor which is mounted rotatably relative to the stator, and
a first inverter and a second inverter,
wherein the first inverter and the second inverter each have three inverter units, each for one electrical phase of a polyphase AC voltage.

17. An aircraft comprising the electric machine as claimed in claim 16.

* * * * *